United States Patent [19]

Itoh et al.

[11] Patent Number: 5,006,614
[45] Date of Patent: Apr. 9, 1991

[54] EPOXY RESIN COMPOSITION AND SEMICONDUCTOR DEVICE ENCAPSULATED THEREWITH CONTAINING POLYMALEIMIDE AND (ALLYL-EPOXY)NOVOLAC/SILOXANE GRAFT COPOLYMER

[75] Inventors: Kunio Itoh; Toshio Shiobara; Koji Futatsumori, all of Annaka, Japan

[73] Assignee: Shin-Etsu Chemical Co., Ltd., Tokyo, Japan

[21] Appl. No.: 373,286

[22] Filed: Jun. 29, 1989

[30] Foreign Application Priority Data

Jul. 5, 1988 [JP] Japan ................. 63-167117

[51] Int. Cl.$^5$ .................. C08L 63/02; C08L 63/04
[52] U.S. Cl. ..................... 525/476; 525/487; 523/443; 523/445; 523/466; 523/457
[58] Field of Search ......................... 525/476

[56] References Cited

U.S. PATENT DOCUMENTS

| | | | |
|---|---|---|---|
| 2,819,245 | 7/1958 | Shorr ................... | 525/476 |
| 4,376,174 | 3/1983 | Itoh et al. ............. | 523/456 |
| 4,657,986 | 4/1987 | Isayama et al. ........ | 525/476 |
| 4,877,822 | 10/1989 | Itoh et al. ............ | 525/476 |

FOREIGN PATENT DOCUMENTS

| | | |
|---|---|---|
| 58-21417 | 2/1983 | Japan . |
| 59-129252 | 7/1984 | Japan . |
| 788806 | 1/1958 | United Kingdom . |
| 906544 | 9/1962 | United Kingdom . |

*Primary Examiner*—Earl Nielsen
*Assistant Examiner*—Frederick Krass
*Attorney, Agent, or Firm*—Birch, Stewart, Kolasch & Birch

[57] ABSTRACT

A curable epoxy resin is blended with (a) an alkenyl group-containing epoxidized novolak resin/organopolysiloxane copolymer and (b) a polyimide resin in addition to a curing agent and an inorganic filler. The resulting epoxy resin composition can be cured both under moisture-free conditions and even under moist conditions without inducing a crack. It is suitable for the encapsulation of semiconductor devices as well as for molding and powder coating.

9 Claims, No Drawings

EPOXY RESIN COMPOSITION AND SEMICONDUCTOR DEVICE ENCAPSULATED THEREWITH CONTAINING POLYMALEIMIDE AND (ALLYL-EPOXY)NOVOLAC/SILOXANE GRAFT COPOLYMER

This invention relates to epoxy resin compositions for use as molding compositions and powder coating compositions as well as semiconductor encapsulating material. It also relates to semiconductor devices encapsulated with such epoxy resin compositions in cured form.

BACKGROUND OF THE INVENTION

Epoxy resins and their compositions having inorganic fillers blended therein are widely used as molding material, powder coating material, electrical insulating material and the like because of their moldability, bond strength, electrical properties, mechanical properties, and humidity resistance. In recent years, they have been used as encapsulating materials for semiconductor chips.

However, prior art epoxy resin compositions tend to crack upon curing, forming molded and coated articles having a less desirable appearance. Particularly, when they are used for the encapsulation of semiconductor devices, most of them are likely to produce defects in semiconductor elements or devices.

Several improvements are known in the prior art. Japanese Patent Application Kokai No. 21417/1983 discloses an epoxy resin composition having blended therein a copolymer of an aromatic polymer and an organopolysiloxane. It is also proposed to use an alkenyl group-containing novolak epoxy resin as the aromatic polymer for such a composition as disclosed in Japanese Patent Application Kokai No. 84147/1987 or European Patent Application No. 218228.

Surface packaging is currently one of the most often used practical techniques for semiconductor device packaging. Such advanced packaging techniques often cause the encapsulating resin to be exposed to elevated temperatures of, say, 215° to 300° C., as by infrared reflow or solder bath. In many cases, semiconductor devices are allowed to stand for some time between resin encapsulation and packaging. During standby time the encapsulating resin tends to absorb moisture from the ambient air. When the encapsulated element is subjected to infrared reflow or immersed in a solder bath for packaging, the molded epoxy resin which has absorbed moisture is suddenly heated to elevated temperatures so that the absorbed water may evaporate into vapor. The thus created vapor pressure causes the encapsulating resin to crack to detract from the outside appearance and sometimes induces defects in the semiconductor element or device.

Therefore, epoxy resin compositions, particularly those intended for use in the encapsulation of semiconductor devices, are required to have such properties that cured moldings are resistant to cracking not only in moisture-free state, but also upon heating after moisture absorption.

SUMMARY OF THE INVENTION

An object of the present invention is to provide a novel and improved epoxy resin composition which is resistant to cracking not only in a moisture-free state, but also upon heating after moisture absorption.

Another object of the present invention is to provide a novel and improved epoxy resin composition which can be cured into a crack resistant article having high mechanical strength, a low coefficient of expansion, and a high glass transition temperature.

A further object of the present invention is to provide a semiconductor device encapsulated with a cured epoxy resin composition.

The inventors have found that when a copolymer obtained through addition reaction between an alkenyl group of an alkenyl group-containing epoxidized novolak resin and a ≫SiH group of an organopolysiloxane represented by the following general formula (1) and a polyimide resin are blended with an epoxy resin, there is obtained an epoxy resin composition having improved crack resistance, adherence, and high-temperature strength. The composition having both the specific copolymer and the polyimide resin blended therein has improved crack resistance not only in moisture-free state, but also after moisture absorption as compared with a similar composition having only the polyimide resin blended.

According to the present invention, there is provided an epoxy resin composition comprising a curable epoxy resin, a curing agent, and an inorganic filler, characterized in that the composition further comprises:

(a) a copolymer obtained through addition reaction between an alkenyl group of an alkenyl group-containing epoxidized novolak resin and a ≫SiH group of an organopolysiloxane represented by the general formula:

$$H_aR_bSiO[4-(a+b)]/2 \qquad (1)$$

wherein R is a monovalent substituted or unsubstituted hydrocarbon group, the letter a has a value of from 0.01 to 0.1, the letter b has a value of from 1.8 to 2.2, and $1.81 \leq a+b \leq 2.3$, and having 20 to 400 silicon atoms and 1 to 5 ≫SiH groups per molecule, and (b) a polyimide resin.

The present invention also provides a semiconductor device encapsulated with the epoxy resin composition in cured form.

DETAILED DESCRIPTION OF THE INVENTION

The curable epoxy resin which is a base of the present composition includes those epoxy resins having at least 2 epoxy groups per molecule. The epoxy resins are not particularly limited in molecular structure, molecular weight and the like as long as they can be cured with any desired curing agent as will be described later. They may be selected from a variety of conventional well-known epoxy resins including epoxy resins synthesized from epichlorohydrin and various novolak resins such as bisphenols, alicyclic epoxy resins, and halo-modified epoxy resins having introduced a halogen atom such as chlorine and bromine. These epoxy resins may be used alone or in admixture of two or more. Preferred are epoxidized phenol novolak or cresol novolak resins, epoxidized triphenolmethane and polymers thereof.

In the practice of the present invention, a monoepoxy compound may be used along with the above-mentioned epoxy resin. Examples of the useful monoepoxy compound include styrene oxide, cyclohexene oxide, propylene oxide, methyl glycidyl ether, ethyl glycidyl ether, phenyl glycidyl ether, allyl glycidyl ether, octylene oxide, and dodecene oxide.

The second component of the epoxy resin composition of the invention is a curing agent. The curing agent may be selected from conventional well-known curing agents including amines such as diaminodiphenylmethane, diaminodiphenylsulfone, and m-phenylenediamine; acid anhydrides such as phthalic anhydride, pyromellitic anhydride, and benzophenone-tetracarboxylic anhydride; and phenol novolak curing agents having at least two hydroxyl groups per molecule such as phenol novolak resins and cresol novolak resins. The curing agent may be blended in commonly used amounts, preferably in amounts of 10 to 200 parts by weight, more preferably 50 to 150 parts by weight per 100 parts by weight of the epoxy resin.

If desired, a curing promoter may be blended for the purpose of promoting reaction between the epoxy resin and the curing agent. The curing promoter may be selected from conventional well-known agents including imidazole and its derivatives, tertiary amine derivatives, phosphine derivatives, and cycloamidine derivatives. The promoter may be added in commonly used amounts, preferably in amounts of 0 to 30 parts by weight, more preferably 1 to 5 parts by weight per 100 parts by weight of the epoxy resin.

The third component of the epoxy resin composition of the invention is an inorganic filler. A proper type of inorganic filler may be chosen depending on a particular application of the composition. For example, a choice may be made of naturally occurring silica species such as crystalline silica and amorphous silica, synthetic high purity silica, synthetic spherical silica, talc, mica, silicon nitride, boron nitride, and alumina, and mixtures thereof.

The inorganic filler is preferably blended in amounts of about 100 to about 1,000 parts by weight, more preferably about 250 to about 750 parts by weight per 100 parts by weight of the epoxy resin plus curing agent. Less amounts of the inorganic filler will be less effective for its purpose of increasing the strength of the composition. Sometimes physical properties such as crack resistance become less desirable. Larger amounts of the inorganic filler beyond the range would adversely affect the flow of the composition and are difficult to disperse.

According to the present invention, the epoxy resin composition further contains (a) a specific copolymer and (b) a polyimide resin. Component (a) is a copolymer obtained through addition reaction between an alkenyl group of an alkenyl group-containing epoxidized novolak resin and a ≥SiH group of an organopolysiloxane represented by the general formula:

$$H_a R_b SiO[4-(a+b)]/2 \quad (1)$$

wherein R is a monovalent substituted or unsubstituted hydrocarbon group, the letter a has a value of from 0.01 to 0.1, the letter b has a value of from 1.8 to 2.2, and $1.81 \leq a+b \leq 2.3$, and having 20 to 400 silicon atoms and 1 to 5 ≥SiH groups per molecule.

The monovalent substituted or unsubstituted hydrocarbon groups represented by R may preferably have 1 to 10 carbon atoms and include an alkyl group having 1 to 10 carbon atoms such as methyl, ethyl, propyl, and butyl groups, an aryl group having 6 to 10 carbon atoms such as phenyl and tolyl groups, an alkoxy group having 1 to 5 carbon atoms such as methoxy and ethoxy groups,

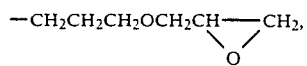

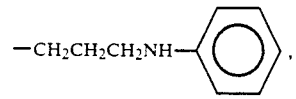

and substituted alkyl and aryl groups in which at least one hydrogen atom is substituted with a halogen atom, such as $ClCH_2-$, $CF_3C_2H_4-$, $ClC_3H_6-$, and

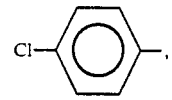

and mixtures thereof. The amount of alkoxy group introduced in R may preferably range from 0 to 10 mol %. Most preferred are methyl, phenyl and 2-trimethoxysilylethyl groups and mixtures thereof.

Preferred ranges of a and b are:

|  | Preferred | More preferred |
| --- | --- | --- |
| a | 0.01–0.08 | 0.01–0.07 |
| b | 1.9–2.2 | 2.0–2.1 |
| a + b | 1.91–2.3 | 2.01–2.05 |

Also preferably, the number of silicon atoms ranges from 20 to 300, more preferably from 30 to 200 and the number of ≥SiH groups is 2 or 3.

The alkenyl group-containing epoxidized novolak resin which is one component of the copolymer may be prepared by epoxidizing an alkenyl group-containing phenolic resin with epichlorohydrin or partially reacting a conventional well-known epoxy resin with 2-allylphenol or allyl alcohol, for example. Illustrative examples of the alkenyl group-containing epoxidized novolak resin are those of formulae (2) to (4) shown below.

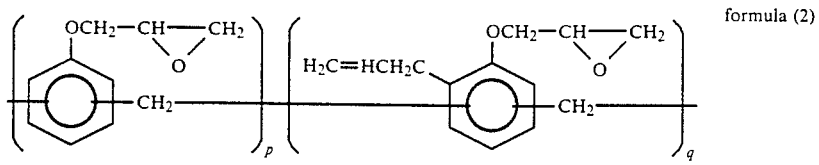

formula (2)

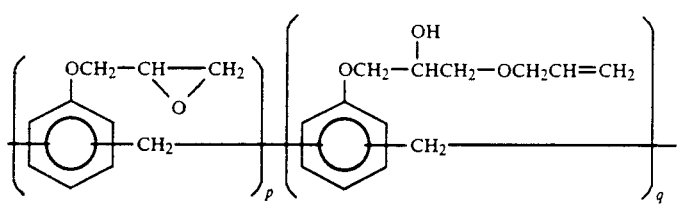

formula (3)

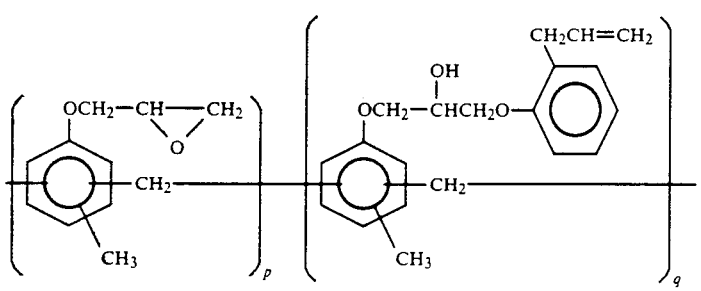

formula (4)

In formulae (2) to (4), p and q are positive numbers in the range: $1 \leq p \leq 10$ and $1 \leq q \leq 3$.

The organopolysiloxane of formula (1) which is the other component of the copolymer has 20 to 400 silicon atoms per molecule and 1 to 5 -SiH groups per molecule as described above. Preferred are both hydrogen terminated dimethylpolysiloxane, both hydrogen terminated methylphenylpolysiloxane, and both hydrogen terminated methyl-(2-trimethoxysilylethyl)polysiloxane. Illustrative examples of the organopolysiloxane are those of formulae (5) to (9) shown below.

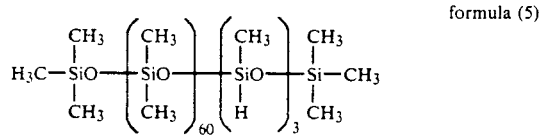

formula (5)

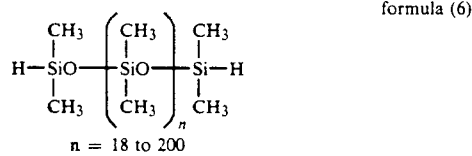

formula (6)

n = 18 to 200

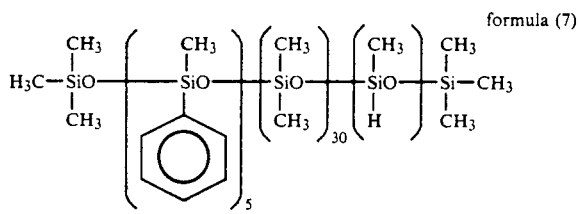

formula (7)

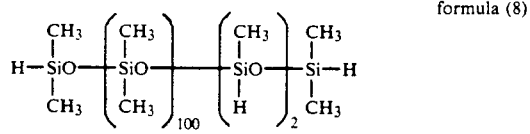

formula (8)

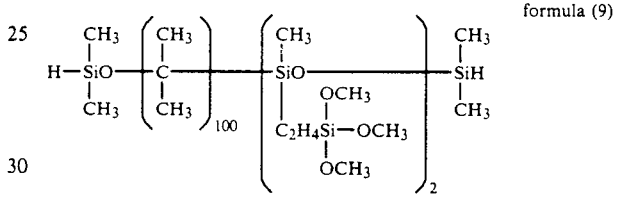

formula (9)

It is recommended to introduce a group such as

—$C_2H_4Si(OCH_3)_3$, —$CH_2$—$CH_2COOCH_2Si(OCH_3)_3$,

—$CH_2CH_2CH_2OCH_2CH$——$CH_2$, and
\\ /
O

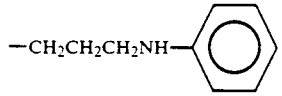

into organopolysiloxanes as their side chain, as exemplified by formula (9), for dispersion and adherence.

The organopolysiloxane of formula (1) preferably has a degree of polymerization, that is the number of silicon atoms per molecule (n), of 20 to 400, preferably 20 to 300, more preferably 30 to 200. If the degree of polymerization n is less than 20, it is rather difficult to impart adequate flexibility and a high glass transition temperature (Tg). If n is over 400, preparation of copolymers becomes technically very difficult. Even if such copolymers are obtained, they cannot be readily dispersed, almost failing to attain the purposes of the invention. In general, as n increases, organopolysiloxanes show better results with respect to the cracking resistance and glass transition temperature for the same silicon content, but tend to lower in dispersibility and adherence to elements. It will be understood that introduction of the above-mentioned functional groups compensates for a lowering of dispersibility and adherence.

The copolymer (a) may be prepared by heating an alkenyl group-containing epoxidized novolak resin and an organopolysiloxane of formula (1) in the presence of a conventional well-known addition catalyst, for example, a platinum catalyst such as chloroplatinic acid, thereby reacting an alkenyl group of the former with a SiH group of the latter. It is preferred that the copolymer a solubility parameter of from 7.3 to 8.5, especially from 7.6 to 8.2. A copolymer having such a solubility parameter may be prepared by reacting an organopolysiloxane and an alkenyl group-containing epoxy resin such that $0.7 < A/B < 7$, especially $1 \leq A/B \leq 5$ wherein A is the equivalent of $\geqslant$SiH of the organopolysiloxane and B is the molecular weight of the epoxy resin. The solubility parameter SP used herein is defined by the following equation:

$$(SP)^2 = \Delta E/V \text{ (cal/cc)}$$

wherein $\Delta E$ is an evaporation energy (cal/mol) and V is a molar volume (cc/mol).

In the preferred embodiment of the invention, the copolymer (a) is blended in the epoxy resin composition such that 1 to 100 parts by weight, especially 2 to 60 parts by weight of copolymer (a) is present per 100 parts by weight of the epoxy resin plus curing agent. On this basis, less than 1 part of copolymer (a) will be less effective in improving the glass transition temperature, crack resistance, and aluminum wire restraint. Inclusion of more than 100 parts of copolymer (a) will give epoxy resin compositions which appear to have low mechanical strength.

The composition of the present invention also contains polyimide resin (b). The polyimide resin may be any desired one of well-known conventional polyimide resins. Preferred are those polyimide resins having a melting point of up to 150° C. Most preferred are polymaleimide resins, especially bismaleimide resins. Some non-limiting examples of the polyimide resin include N,N'-diphenylmethanebismaleimide, N,N'-phenylenebismaleimide, N,N'-diphenyletherbismaleimide, N,N'-ethylenebismaleimide, N,N'-xylylenebismaleimide, and the compound of the following formula, alone and mixtures thereof.

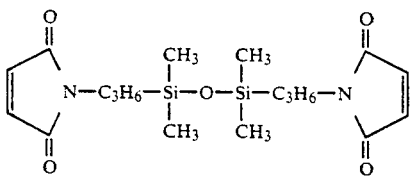

In the preferred embodiment of the invention, the polyimide resin (b) is blended in the epoxy resin composition such that 1 to 100 parts by weight, especially 2 to 60 parts by weight of copolymer (a) is present per 100 parts by weight of the epoxy resin plus curing agent. On this basis, less than 1 part of polyimide resin (b) will be less effective for its purposes, especially in improving the crack resistance. Inclusion of more than 100 parts of polyimide resin (b) will give epoxy resin compositions which tend to inefficiently cure.

The epoxy resin composition of the invention may further contain any other additives if desired, depending on a particular end or application of the composition. These optional additives include mold release agents such as wax and fatty acids (e.g., stearic acid) and fatty acid metal salts, pigments such as carbon black, dyes, anti-oxidants, flame retardants, surface treating agents such as γ-glycidoxypropyltrimethoxysilane, and the like.

The epoxy resin composition of the present invention may be prepared by a conventional method as by mixing predetermined amounts of the above-mentioned components, milling the mixture in suitable milling means preheated at about 70° to 95° C., for example, a kneader, roll mill or extruder, and cooling the mixture, followed by comminuting. The order of blending the necessary components is not critical. However, blending a premix of components (a) and (b) which have been melt mixed gives better results than blending separate components (a) and (b) probably because of enhanced dispersion of component (b) in the entire composition.

The epoxy resin composition of the present invention is advantageously used as a molding composition and a powder coating composition. It is also feasible for the encapsulation of semiconductor devices such as IC, LSI, transistors, thyristors, and diodes and the manufacture of printed circuit boards. When it is used to encapsulate semiconductor devices, a commonly used molding technique for such purpose may be used, including transfer molding, injection molding and casting. The epoxy resin composition of the invention favors molding at a temperature in the range of about 150° to about 180° C. and post curing at a temperature in the range of about 150° to about 180° C. for about 2 to about 16 hours.

The epoxy resin composition has been described in which a curable epoxy resin is blended with (a) a specific copolymer obtained through addition reaction between an alkenyl group of an alkenyl group-containing epoxidized novolak resin and a $\geqslant$SiH group of an organopolysiloxane of formula (1) and (b) polyimide resin in addition to a curing agent and an inorganic filler. The epoxy resin composition can be molded and cured into an article having improved crack resistance both in moisture-free and moisture-absorbed states, a high coefficient of expansion, and a high glass transition temperature while maintaining mechanical strengths including flexural strength and flexural modulus. The composition is useful as molding material and powder coating material and especially advantageous as semiconductor encapsulating material. A semiconductor device encapsulated with the composition in cured form has high reliability.

EXAMPLE

Examples of the present invention are given below together with comparative examples by way of illustration and not by way of limitation. All parts and percents are by weight unless otherwise stated.

First, preparation of curable epoxy resins and additive copolymers is described.

Synthesis 1

A 1-liter four-necked flask equipped with a reflux condenser, thermometer, stirrer, and drop funnel was charged with 300 grams of an epoxidized phenol novolak resin having a softening point of 80° C. and an epoxy equivalent of 195. While the contents were stirred at a temperature of 110° C., a mixture of 32 grams of 2-allylphenol and 1 gram of tributylamine was added dropwise to the flask over 10 minutes. Stirring was continued for an additional 2 hours at a temperature of 110° C. The reaction product was vacuum stripped of the unreacted 2-allylphenol and tributylamine, yielding an allyl group-containing epoxy resin having an allyl equivalent of 1490 and an epoxy equivalent of 235.

A four-necked flask as used above was charged with 120 grams of the allyl group-containing epoxy resin prepared above, 100 grams of methyl isobutyl ketone, 200 grams of toluene, and 0.04 grams of a 2-ethylhexanol modified chloroplatinic acid solution having a platinum concentration of 2%. The mixture was azeotroped for 1 hour with water removal. Then 80 grams of each of the organopolysiloxanes shown in Table 1 was added dropwise over 30 minutes at the reflux temperature. Reaction was continued at the same temperature for a further 4 hours with stirring. The reaction mixture was washed with water and vacuum stripped of the solvent, yielding the reaction product. In this way there were obtained Copolymers I, II, and III as shown in Table 1.

TABLE 1

| | Copolymer | | |
|---|---|---|---|
| | I | II | III |
| Starting organopolysiloxane* | A | B | C |
| Appearance | pale yellow clear solid | whitish yellow opaque solid | whitish yellow opaque solid |
| Melt viscosity, cp @150° C. | 650 | 760 | 890 |
| Heating loss, % @150° C., 1 hr | 0.42 | 0.56 | 0.45 |

Note:
Organopolysiloxanes A, B and C are of the following formulae.

Organopolysiloxane A:

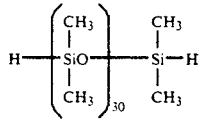

Organopolysiloxane B:

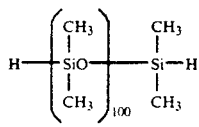

Organopolysiloxane C:

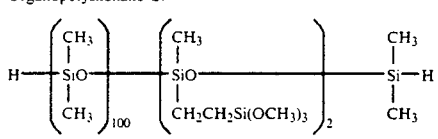

Synthesis 2

A four-necked flask as used in Synthesis 1 was charged with 200 grams of an allyl glycidyl ether-modified phenol novolak resin having a softening point of 100° C., a phenol equivalent of 125, and an allyl equivalent of 1100, 800 grams of chloromethyloxirane, and 0.6 grams of cetyltrimethylammonium bromide. The contents were stirred for 3 hours while the flask was heated at a temperature of 110° C. Then the flask was cooled down to 70° C. and evacuated to a vacuum of 160 mmHg. Then 128 grams of an aqueous solution of 50% sodium hydroxide was added dropwise over 3 hours while water was azeotropically removed. The reaction mixture was vacuum stripped of the solvent and then dissolved in a mixture of 300 grams of methyl isobutyl ketone and 300 grams of acetone. The mixture was washed with water and again vacuum stripped of the solvents, obtaining an allyl group-containing epoxy resin having an allyl equivalent of 1590 and an epoxy equivalent of 190.

Copolymers IV and V were prepared by the same procedure as in Synthesis 1 using the above-prepared epoxy resin and an organopolysiloxane. The organopolysiloxanes used and the resulting copolymers are shown in Table 2.

TABLE 2

| | Copolymer | |
|---|---|---|
| | IV | V |
| Starting organopolysiloxane* | A | B |
| Appearance | pale yellow clear solid | whitish yellow opaque solid |
| Melt viscosity, cp @ 150° C. | 530 | 660 |
| Heating loss, % @ 150° C., 1 hr | 0.34 | 0.40 |

*Organopolysiloxanes A and B are as identified in Table 1.

EXAMPLES 1-12

Epoxy resin compositions were prepared by blending an epoxidized cresol novolak resin having an epoxy equivalent of 200 (designated Epoxy Resin), a phenol novolak resin having a phenol equivalent of 110, Copolymers I to V synthesized as above, Polyimide Resins I and II defined below, triphenylphosphine (TPP), and 1,8-diazabicycloundecene-7 (DBU) in the amounts shown in Table 3. To each of the blends were further added 10 parts of a brominated epoxy novolak resin, 260 parts of powder quartz, 1.5 parts of 3-glycidoxypropyltrimethoxysilane, 1.5 parts of wax E, and 1.0 part of carbon black. The resulting blends were melt milled between a pair of hot mill rolls until they became homogeneous.

The polyimide resins used are shown below.
Polyimide Resin I: N,N'-diphenylmethane bismaleimide
Polyimide Resin II:

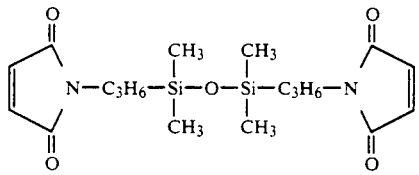

The epoxy resin compositions were examined by the following tests.

(A) Spiral flow test
Spiral flow was measured at 175° C. and 70 kg/cm² using a mold according to the EMMI standard.

(B) Mechanical strength (Flexural strength and modulus)
Test bars of 10×100×4 mm (thick) were molded at 175° C. under 70 kg/cm² for 2 minutes and post cured at 180° C. for 4 hours. Flexural strength and modulus were measured according to JIS K-6911.

(C) Expansion coefficient and Glass transition temperature
A dilatometer was used to measure a test rod of 4 mm diameter by 15 mm for expansion coefficient and glass transition temperature (Tg) by heating at a rate of 5° C. per minute.

(D) Moisture-free crack resistance
Crack resistance in moisture-free state was examined. A silicon chip of 9.0×4.5×0.5 mm was bonded to a 14-pin IC frame (42 alloy). The assembly was encapsulated with an epoxy resin composition by molding the composition around the assembly at 180° C. for 2 minutes and post curing at 180° C. for 4 hours. The encapsulated article was subjected to thermal cycling between −196° C./1 min. and 260° C./30 sec. It was observed for occurrence of cracks in the resin at the end of 50 cycles. The crack resistance is a percent occurrence of cracked samples per 50 samples.

(E) Deformation of aluminum electrode for 200 and 400 hours. The LSI's were tested for electrical operation. A percent of failed LSI's was reported. The results are shown in Table 3.

TABLE 3

| | Example | | | | | | | | | | | |
|---|---|---|---|---|---|---|---|---|---|---|---|---|
| | 1 | 2 | 3 | 4 | 5 | 6 | 7 | 8 | 9 | 10* | 11* | 12* |
| Composition (parts by weight) | | | | | | | | | | | | |
| Epoxy resin | 38 | 38 | 38 | 37 | 37 | 38 | 37 | 37 | 32 | 56 | 57 | 52 |
| Phenol resin | 28 | 28 | 28 | 29 | 29 | 28 | 29 | 29 | 26 | 34 | 25 | 22 |
| Copolymer I | 16 | — | — | — | — | — | — | — | 16 | — | — | — |
| Copolymer II | — | 16 | — | — | — | 16 | — | — | — | — | — | — |
| Copolymer III | — | — | 16 | — | — | — | — | — | — | — | — | — |
| Copolymer IV | — | — | — | 16 | — | — | — | — | — | — | — | — |
| Copolymer V | — | — | — | — | 16 | — | 16 | 16 | — | — | — | 16 |
| Polyimide I | 8 | 8 | 8 | 8 | 8 | 8 | — | — | 16 | — | 8 | — |
| Polyimide II | — | — | — | — | — | — | 8 | 8 | — | — | — | — |
| TPP | 1.0 | 1.0 | 1.0 | 1.0 | 1.0 | — | 1.0 | — | 1.0 | 1.0 | 1.0 | 1.0 |
| DBU | — | — | — | — | — | 1.0 | — | 1.0 | — | — | — | — |
| Properties | | | | | | | | | | | | |
| Spiral flow, inch | 31 | 30 | 28 | 34 | 31 | 32 | 33 | 34 | 30 | 30 | 31 | 30 |
| Flexural strength, kg/mm$^2$ | 13.5 | 13.6 | 12.8 | 13.3 | 14.1 | 13.5 | 11.9 | 12.4 | 12.8 | 13.5 | 12.6 | 14.0 |
| Flexural modulus, kg/mm$^2$ | 1180 | 1210 | 1230 | 1250 | 1190 | 1110 | 1080 | 1090 | 1250 | 1400 | 1430 | 1200 |
| Expansion coefficient, $10^{-5}$/°C. | 1.7 | 1.7 | 1.7 | 1.7 | 1.7 | 1.7 | 1.7 | 1.7 | 1.7 | 1.8 | 1.8 | 1.7 |
| Tg, °C. | 175 | 173 | 176 | 175 | 170 | 165 | 164 | 164 | 194 | 158 | 162 | 167 |
| Moisture-free crack resistance, % | 0 | 0 | 0 | 0 | 0 | 0 | 0 | 0 | 0 | 100 | 100 | 0 |
| Al electrode deformation, μm | 0 | 0 | 0 | 0 | 0 | 0 | 0 | 0 | 0 | 0.4 | 0.5 | 0 |
| Moistened crack resistance, % | 0 | 0 | 0 | 0 | 0 | 0 | 0 | 0 | 0 | 100 | 20 | 100 |
| LSI moisture resistance, % | | | | | | | | | | | | |
| 200 hours | 0 | 0 | 0 | 0 | 0 | 0 | 0 | 0 | 0 | 52 | 6 | 50 |
| 400 hours | 0 | 2 | 0 | 0 | 0 | 0 | 4 | 6 | 0 | 86 | 38 | 68 |

*outside the scope of the invention

An aluminum electrode was vacuum deposited on a silicon chip of 3.4×10.2×0.3 mm to form a test element for deformation measurement. The test element was bonded to a 14-pin IC frame (42 alloy). The assembly was encapsulated with an epoxy resin composition by molding the composition around the assembly at 180° C. for 2 minutes and post curing at 180° C. for 4 hours. The encapsulated article was subjected to thermal cycling between −196° C./1 min. and 260° C./30 sec. The amount (μm) of deformation of the aluminum electrode was measured at the end of 200 cycles. The result was an average of three samples.

(F) Moistened crack resistance

Crack resistance after moisture absorption was examined. A silicon chip of 10.0×8.0×0.3 mm was bonded to a 64-pin QFP frame (42 alloy). The assembly was encapsulated with an epoxy resin composition by molding the composition around the assembly at 180° C. for 2 minutes and post curing at 180° C. for 4 hours. The encapsulated article was allowed to stand for 72 hours in a constant temperature, constant humidity tank at 85° C., RH 85%. It was then immersed for 10 seconds in a solder bath at 260° C. It was observed for occurrence of cracks in the resin. The crack resistance is a percent occurrence of cracked samples per 20 samples.

(G) Moisture resistance of LSI

One hundred fifty 256-k bit DRAM memory LSI's were tested. Each LSI was encapsulated with an epoxy resin composition by molding the composition at 180° C. for 2 minutes and post curing at 180° C. for 4 hours. The encapsulated article was allowed to stand for 24 hours in a constant temperature, constant humidity tank at 85° C., RH 85%. It was then immersed for 60 seconds in vapor phase solder (VPS) at 215° C. and then allowed to stand in saturated steam at 121° C. and 2 atmospheres for 200 and 400 hours. The LSI's were tested for electrical operation. A percent of failed LSI's was reported. The results are shown in Table 3.

As is evident from Table 3, not only crack resistance in moisture-free conditions is excellent, but crack resistance under moist conditions and LSI moisture resistance are also significantly improved by blending both the copolymer (a) resulting from addition reaction between an alkenyl group-containing epoxidized novolak resin and an organohydrogenpolysiloxane and the polyimide resin (b) with an epoxy resin as compared with separate blending of either copolymer (a) or polyimide resin (b).

Several preferred embodiments have been described. Obviously many modifications and variations of the present invention are possible in the light of the above teachings. It is therefore to be understood that within the scope of the appended claims, the invention may be practiced otherwise than as specifically described.

We claim:

1. An epoxy resin composition comprising:
   a curable epoxy resin selected from the group consisting of epoxy resins synthesized from epichlorohydrin and novolak resins, alicyclic epoxy resins, bis-phenol epoxy resins, halogen substituted derivatives thereof and mixtures thereof;
   a curing agent; and
   an inorganic filler,
   characterized in that the composition further comprises:
   (a) a copolymer obtained through addition reaction between an alkenyl group of an alkenyl group-containing epoxidized novolak resin and a ≥SiH group of an organopolysiloxane represented by the general formula:

$$H_aR_bSiO[4-(a+b)]/2 \quad (1)$$

wherein R is a monovalent substituted or unsubstituted hydrocarbon group, the letter a has a value of from 0.01 to 0.1, the letter b has a value of from 1.8 to 2.2, and $1.81 \leq a+b \leq 2.3$, and having 20 to 400 silicon atoms and 1 to $5 \gg$ SiH groups per molecule; and (b) a polymaleimide resin having a melting point of up to 150° C.

2. An epoxy resin composition as set forth in claim 1 wherein 1 to 100 parts by weight of copolymer (a) is present per 100 parts by weight of the epoxy resin plus curing agent.

3. An epoxy resin composition as set forth in claim 1 wherein 1 to 100 parts by weight of polymaleimide resin (b) is present per 100 parts by weight of the epoxy resin plus curing agent.

4. An epoxy resin composition as set forth in claim 1 wherein in copolymer (a), the organopolysiloxane is a linear diorganopolysiloxane of formula (1) wherein R is selected from the class consisting of methyl, phenyl, and 2-trimethoxysilylethyl groups and mixtures thereof, the molecular chain ends of said diorganopolysiloxane being both capped with dimethylsiloxy groups

5. An epoxy resin composition as set forth in claim 1 wherein polymaleimide resin (b) is a bismaleimide resin.

6. An epoxy resin composition, comprising:

a curable epoxy resin selected from the group consisting of epoxidized phenol novolak resins, epoxidized cresol novolak resins, epoxidized triphenolmethanes, polymers of epoxidized triphenolmethanes and mixtures thereof;

10 to 200 parts by weight per 100 parts by weight of the epoxy resin of a curing agent;

100 to about 1,000 parts by weight per 100 parts by weight of the epoxy resin plus curing agent of an inorganic filler;

1 to 100 parts by weight of a copolymer obtained through addition reaction between an alkenyl group of an alkenyl group-containing epoxidized novolak resin and a $\gg$ SiH group of an organopolysiloxane represented by the general formula:

$$H_aR_bSiO[4-(a+b)]/2 \quad (1)$$

wherein R is a monovalent substituted or unsubstituted hydrocarbon group, the letter a has a value of from 0.01 to 0.1, the letter b has a value of from 1.8 to 2.2, and $1.81 \leq a+b \leq 2.3$, and having 20 to 400 silicon atoms and 1 to $5 \gg$ SiH groups per molecule per 100 parts by weight of the epoxy resin plus the curing agent; and 1 to 100 parts by weight of a polymaleimide resin having a melting point of up to 150° C. per 100 parts by weight of the epoxy resin plus the curing agent.

7. An epoxy resin composition as set forth in claim 6, wherein the letter a has a value of from 0.01 to 0.08, the letter b has a value of from 1.9 to 2.2 and $1.91 \leq a+b \leq 2.3$.

8. An epoxy resin composition as set forth in claim 6, wherein the letter a has a value of from 0.01 to 0.07, the letter b has a value of from 2.0 to 2.1 and $2.01 \leq a+b \leq 2.05$.

9. An epoxy resin composition as set forth in claim 6, wherein the copolymer has 30 to 200 silicon atoms and 2 or $3 \gg$ SiH groups per molecule.

* * * * *